UNITED STATES PATENT OFFICE.

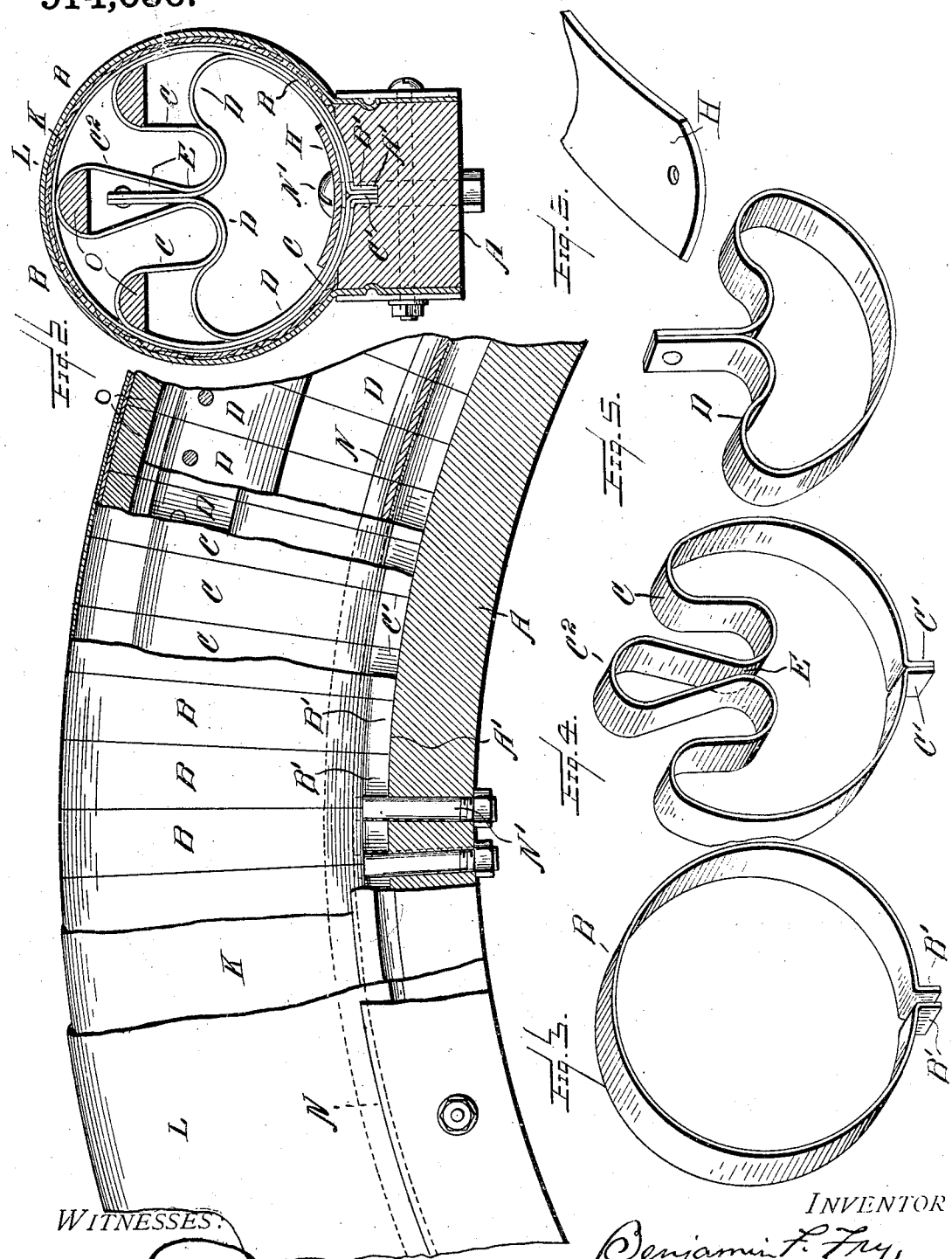

BENJAMIN F. FRY, OF LA CROSSE, WISCONSIN.

CUSHION-TIRE FOR VEHICLE-WHEELS.

No. 914,036.          Specification of Letters Patent.          Patented March 2, 1909.

Application filed April 4, 1908. Serial No. 425,200.

*To all whom it may concern:*

Be it known that I, BENJAMIN F. FRY, a citizen of the United States, residing at La Crosse, in the county of La Crosse and State of Wisconsin, have invented certain new and useful Improvements in Cushion-Tires for Vehicle-Wheels; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in cushion tires for vehicle wheels and the object in view is to produce a simple and efficient device of this character from which may be obtained the same cushioning effect as produced by a pneumatic tire and, at the same time, a much more durable substitute.

The present invention comprises various details of construction, combinations and arrangements of parts which will be hereinafter fully described and then specifically defined in the appended claims.

I illustrate my invention in the accompanying drawings, in which:—

Figure 1 is a side elevation of a portion of a tire, parts being broken away to better illustrate the cushion arrangement therein. Fig. 2 is a cross sectional view through one of the spring sections of the tire. Figs. 3 and 4 are detail views of the tension and core springs; and Fig. 5 is a detail view of one of the core springs, Fig. 6 is a detail perspective view of one of the concaved plates.

Reference now being had to the details of the drawings by letter, A designates the rim of a wheel, it being my purpose to apply my invention to any ordinary rim of a vehicle wheel. Said rim is provided with a circumferential groove A' and has a dished or concaved circumference as is customary with the rim on cushion or pneumatic tire wheels.

B—B designate a series of resilient bands having ends B' bent at angles and adapted to be seated in said circumferential groove. Mounted within each band is a tension spring C, the ends C' of which are adapted to be held frictionally between the ends B' of the band B in said groove, as shown clearly in the cross sectional view of the drawings. A core spring D is interposed within the tension spring C and has its ends fastened together and positioned within the space E in the loop portion of the spring C. The loop portion $C^2$ of the tension spring is adapted to bear against the inner circumference of the band B at a position diametrically opposite the ends of the latter, as shown clearly in the drawings, and adapted to receive the pressure coming thereon and take up vibration. Said springs are fastened in place by means of the concaved plates H held by means of screws N' to the rim and tension regulating bands, designated by letter O, are provided, each of which is convexed upon its outer circumference and flat upon its inner surface, said concaved portions being adapted to bear against the concaved loop portions of the springs, as shown clearly in Fig. 2 of the drawings. A suitable cover K of tar felt is placed about the series of resilient bands B and afterward a second covering or case L, made preferably of canvas, thereby forming a through protection for the parts within.

In assembling, the bands are arranged about the circumference of the wheel with their marginal edges adjacent to each other and afterward the coverings placed thereover, thus making a tire which is practically noiseless and so arranged that any one or more of the bands may be replaced without interference with the others. By the provision of a cushion tire for vehicles as shown and described, a much more durable mechanism is afforded than the ordinary pneumatic tire and practically the same cushioning effect.

What I claim to be new is:—

1. A cushion tire for vehicles comprising, in combination with a rim having a circumferential groove, a series of resilient bands having angled ends engaging said groove, a tension spring having angled ends held between the angled ends of said band in the groove of the rim, a core spring mounted within said band, a plate engaging said core spring, fastening means extending through said plate and the rim whereby the band and springs may be held in place, and a covering for said bands, as set forth.

2. A cushion tire for vehicles comprising, in combination with the rim of a wheel, a series of resilient bands, means for holding the same upon the rim of a wheel, a tension spring having a convolution thereof adapted to bear frictionally against the inner circumference of said band, a core spring having a portion thereof bent upon itself and frictionally engaging a loop portion of the tension spring, means for fastening the springs and band to the rim of a wheel, tension regulating bands convexed upon their outer circumferences and adapted to engage the convolutions of said springs, as set forth.

In testimony whereof I hereunto affix my signature in the presence of two witnesses.

BENJAMIN F. FRY.

Witnesses:
O. R. SKAAR,
WM. TISCH.